United States Patent Office 3,609,805
Patented Oct. 5, 1971

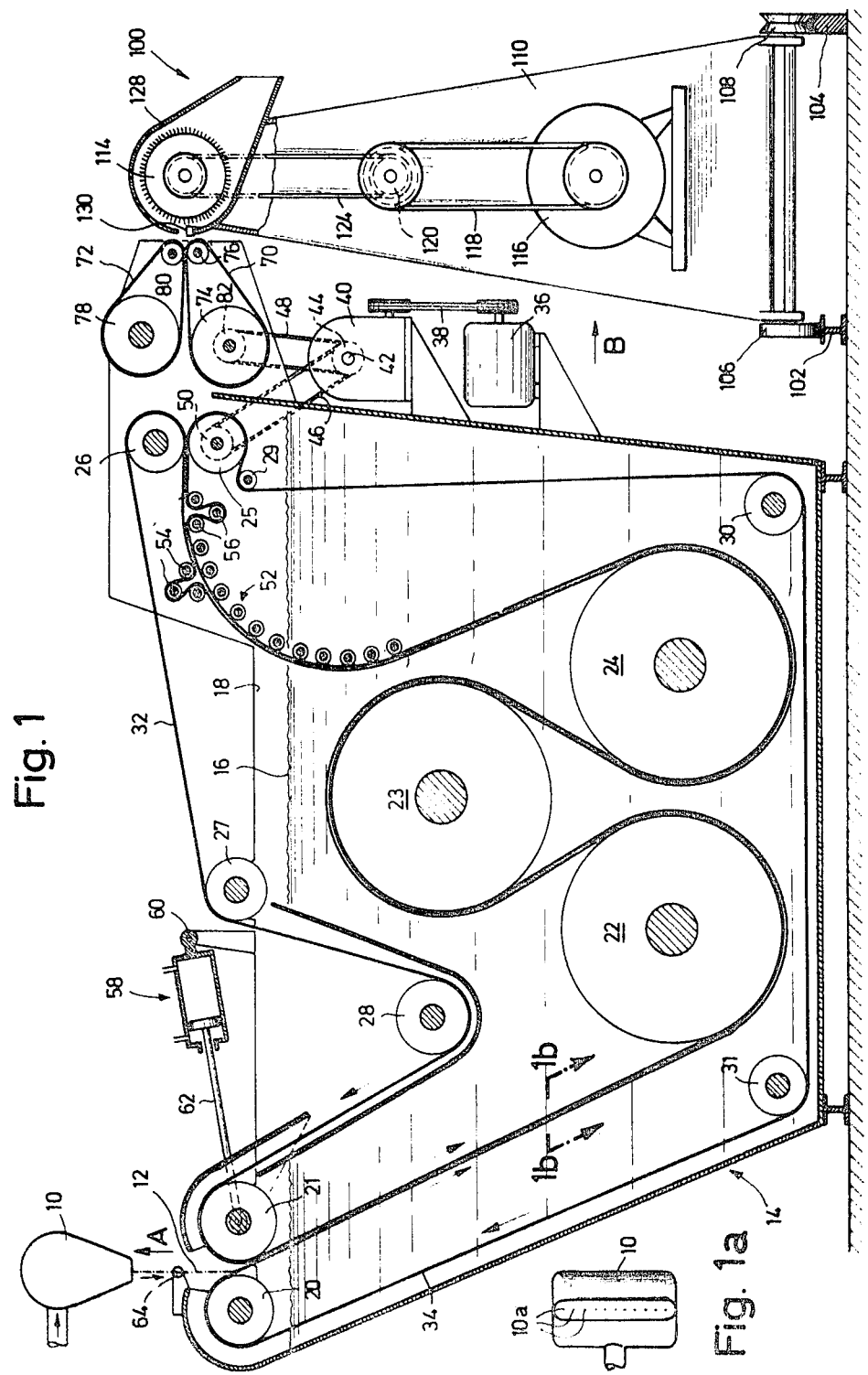

3,609,805
COOLING APPARATUS FOR EXTRUDED SYNTHETIC MATERIAL
Rudolf Paul Fritsch, Stuttgart-Weilimdorf, Germany, assignor to C. F. Scheer & Cie, Stuttgart-Feuerbach, Germany
Filed Mar. 27, 1970, Ser. No. 23,328
Claims priority, application Germany, Mar. 29, 1969, P 19 16 222.2
Int. Cl. B29f 3/08
U.S. Cl. 18—12 TT                    20 Claims

ABSTRACT OF THE DISCLOSURE

Extruded ropes are discharged by a supply nozzle along a downward path where they are gripped between a pair of transporting bands and first inlet rollers guiding the same above the level of a liquid in a container so that the ropes are transported into the liquid until gripped by superimposed portions of the transporting bands passing over a second inlet roller. Thereupon, an electromagnetic means, preferably under control of photoelectric means, retracts one of the first inlet rollers so that the ropes extend directly from the supply nozzle to the superimposed band portions and are transported by the same to following guide rollers in the cooling liquid.

BACKGROUND OF THE INVENTION

The present invention relates to a cooling apparatus in general, and to a cooling apparatus for cooling extruded ropes consisting of a synthetic material before the ropes are cut into granules.

Cooling apparatus is known in which an extrusion nozzle head extrudes simultaneously a plurality of ropes in a plane. In accordance with the prior art the ropes are drawn from the extrusion nozzle head and guided about several guide rollers in a cooling bath, preferably a water bath. When the cooled ropes of synthetic material are discharged from the cooling water, the adhering water is removed, and the ropes are transported to a rotary cutting head which chops the ropes into granules.

The apparatus of the prior art has several disadvantages. For example, if a rope breaks, when discharged from the extrusion nozzle head, the following rope sometimes passes the container with the cooling bath by, and sometimes the rope does not enter the cooling liquid, and floats on the same due to its low specific weight, in both cases, it is necessary to stop the apparatus. Futhermore, since the ropes have to be pulled out of the extrusion nozzles at high speed, the inlet rollers which transport the ropes to the cutting head, must operate at high specific surface pressure, which has the result that the newly extruded ropes of synthetic material are undesirably deformed.

The high transporting speeds which are required render the entry of the ropes into the cooling bath difficult so that during a starting period the apparatus must be operated at low speed permitting the passage of the ropes through the water and through the transporting means by which the ropes are fed to the cutting head. If a rope breaks at a higher speed, the apparatus has to be stopped, and the starting operation has to be repeated at lower speed.

The above disadvantages are particularly undesirable and important since apparatus preceding the cooling apparatus cannot be stopped, for example, so-called compound machines in which synthetic material is dyed, are constructed in such a manner that the liquid molten synthetic material is continuously produced which requires continuous operation of the extrusion nozzle, of the cooling apparatus, and of the cutting head.

Finally, in apparatus of the prior art, the force required for withdrawing the ropes from the extrusion nozzle is exclusively provided by the feeding rollers of the cutting machine in which the cooled ropes of synthetic material are granulated, so that an increase of the withdrawal speed cannot be carried out since this would result in even higher specific surface pressures on the transporting rollers.

Due to these disadvantages of prior art apparatus, apparatus by which extruded ropes of a synthetic material are cooled and chopped into granules for obtaining granulated synthetic material, is not economical, and does not permit an increase of the output.

However, synthetic materials in granulated form is in great demand in the trade, since it has the advantage that it can be easily used in extrusion apparatus or in preliminary plastifying units of extrusion presses. Another advantage is that granulated material can be easily divided into measured amounts, can be transported by compressed air or suction, and can be conveniently packed. Furthermore, there is a demand in the trade for a very fine granulate, whose granules have a diameter of about 1 mm. This is due to the fact that the fine granulate can be mixed with dye powders before used in extrusion presses, and are dyed in a homogeneous manner so that finishing plants can buy the granulated synthetic material in undyed condition, and dye the material before further treating the same. The manufacture of a very fine granulate in large quantities requires a very great operational speed, which cannot be obtained by known apparatus for cooling the extruded ropes of synthetic material.

SUMMARY OF THE INVENTION

It is one object of the invention to overcome the disadvantages of cooling apparatus according to the prior art, and to provide a cooling apparatus capable of operating in a continuous operation at very high speed.

Another object of the invention is to provide a cooling apparatus by which extruded ropes or filaments are economically cooled before being chopped into granules.

Another object of the invention is to provide cooling apparatus which, upon a breakage of the rope, automatically threads the broken rope end into the transporting means of the cooling apparatus.

With these objects in view, one embodiment of the invention comprises container means filled with a cooling medium, preferably water to a predetermined level; supply means preferably including extrusion nozzles above the container means for supplying at least one rope of a warm flexible material along the path; transporting means for transporting the supplied rope through the cooling medium in the container and including a pair of first transporting inlet means located above the level of the cooling medium and under the supply means, and a pair of second transporting inlet means located in the medium in the container means.

The first transporting inlet means have an abutting starting position located in the path of the rope for receiving the same between each other so that the rope is transported during a starting period by the first transporting inlet means into the medium and to the second transporting inlet means which transport the rope further in the medium, and a normal operating position in which the first transporting inlet means are spaced from each other and from the rope so that the same is transported only by the second transporting inlet means from the supply means into and through the medium. The first transporting inlet means are moved between a starting and normal position by operating means, preferably a hydraulic motor, which is under the control of a valve slide controlled by an electric circuit.

In the preferred embodiment of the invention, the transporting means include two transporting bands, and two sets of rollers for guiding and moving the transporting bands, respectively. The two sets of rollers include a pair of first inlet rollers guiding a pair of first band portions of the two transporting bands and forming with the same the first transporting inlet means above the level of the cooling medium. The rollers further comprise a second inlet roller guiding a pair of superimposed abutting band portions of the two transporting bands forming said pair of second transporting inlet means. One of the first inlet rollers is connected to and movable by the operating means between a starting position in which the first band portions about each other and transport the rope, and a normal operating position in which the first band portions are spaced from the rope so that the rope extends from the supply means directly to the superimposed abutting second band portions and is transported by the same.

It will be seen that during a starting period, the first transporting inlet means and the respective band portions transport the rope or ropes to the second inlet means, and when the transported ropes are reliably gripped by the latter, the first transporting inlet means can be made inoperative by spacing the first inlet rollers and corresponding band portions apart.

The apparatus of the invention has not only the advantage that the ropes of synthetic material can be drawn by at least one transporting band at a relatively low specific surface pressure from the extrusion device which results in an increase of the withdrawal speed, but also that a sticking of the ropes to the transporting band can be avoided, since the hopes pass during normal operations over a certain length freely through the cooling medium before being gripped between the abutting band portions passing over the second inlet roller. A further increase of the output is caused by the fact that in the event that a rope breaks, the first transporting inlet means, and more particularly one first inlet roller, is moved to the abutting starting position so that the free end of the broken rope can be caught already above the level and top surface of the cooling medium.

The guide rollers following the second inlet roller are staggered and guide the rope along a tortuous path in the cooling medium so that the container can be made short, and requires less space than in known apparatus.

Since a high withdrawal speed and at the same time a relatively low specific surface pressure is an important factor, it is advantageous to use a pair of cooperating transporting bands, one of which is pressed by a movable inlet roller into abutment with the other transporting band in a starting position, and is withdrawn in the normal operating position of the apparatus to form a gap so that the rope can extend to the abutting band portions in the medium. As a result, extrusion nozzles with comparatively great bores can be used so that, irrespective of great quantities of materials formed into ropes, the working pressures are comparatively below so that damage to the synthetic material of the ropes is prevented. Since very high transporting speeds are possible, the withdrawn ropes are stretched and reduced in diameter.

The control of the first transporting inlet means, and more particularly of the movable first inlet roller is constructed in accordance with the invention so that the first inlet means assume the effective starting position if one or several ropes break, and are rendered inoperative and withdrawn when the ropes are properly gripped by the abutting transporting bands of the second transporting inlet means. A sensing device is arranged in the path of the extruded ropes and responds to rope breakage by controlling the electromagnetic operating means of the first inlet roller in such a manner that the first transporting inlet means are effective at the beginning of an extrusion operation or after breakage of the rope during a predetermined adjustable time period, and then are moved automatically to the normal operating position in which only the second transporting inlet means is operative, and the first transporting inlet means are spaced. The time interval, which can be adjusted in accordance with operational conditions, depends on the transporting speed of the ropes and on the distance between the sensing means and the second transporting inlet means.

In the preferred embodiment of the invention, two transporting bands in superimposed abutting condition are guided over staggered guide rollers along a tortuous path. When the superimposed transporting bands are deflected in opposite directions about successive guide rollers, the bands move at different speeds due to the thickness thereof, namely the outer band on a guide roller moves at a higher speed than the inner band on the same guide roller, while on the next guide roller on which the bands are bent in the opposite direction, the band which moved previously at a higher speed, is now the inner band and moves at a lower speed. Since the two bands cannot slide on each other, in the apparatus of the invention, this would cause stretching and compression of the bands, resulting in damage to the bands. This disadvantage is overcome by making at least one of the transporting bands elastic in longitudinal direction. In order to prevent deformation of not yet fully hardened ropes of synthetic material, it is preferred to make the transporting bands elastic also in the direction of their thickness so that the transported ropes are embedded in the deformed elastic material, preferably foam material. Preferably, a fabric is lined with foam material, and due to the resulting thickness it is necessary to make the fabric longitudinally elastic. It is advantageous to make the lining elastic not only in the direction of thickness of the band, but also porous, so that a certain amount of the cooling medium is retained which reduces the danger of sticking of ropes to the transporting bands, particularly when the first inlet roller presses the respective transporting band against the other transporting band. The ropes are reliably embedded in the elastic and porous material which is filled with the cooling medium. It is advantageous to make the two transporting bands of the same thickness so that the abutment surfaces of the two transporting bands are located in the neutral zone of the thickness in bent positions of the transporting bands whereby the two transporting bands are not displaced in longitudinal direction relative to each other.

In order to supply the cooled ropes in dry condition to the cutting devices, it has been found advantageous to design the distance which the ropes are transported by two transporting bands so that the ropes are still warm enough when leaving the cooling liquid to evaporate an adhering amount of cooling medium, while remaining sufficiently stable for the cutting operation. The distance has to be selected depending on the transporting speed of the ropes, and on the properties of the cooling medium and of the synthetic material of the ropes.

In one embodiment of the invention, a single container is provided, which is completely filled with the liquid cooling medium since it is required to make the distance between the level of the cooling medium, and the second transporting inlet means as great as possible so that at least the surface of the ropes is sufficiently hardened to prevent sticking to a transporting band. The cooling properties of different synthetic materials are very different, so that temperature of the ropes at the moment of leaving the cooling medium, depends to a great extent on the type of synthetic material of which the ropes are formed.

It is necessary that synthetic material is completely hardened over the entire cross section of the ropes, when the ropes leave the cooling medium and are supplied to the cutting head. On the other hand, the cooling ropes should not be completely cooled so that sufficient heat remains accumulated in the ropes for vaporizing moisture adhering to the surface of the ropes. An apparatus in which only one container and one cooling medium at a predetermined level is provided, cannot cool ropes consisting of very different synthetic materials accurately to the different required temperatures.

In an improved embodiment of the invention, two containers are provided in which the level of the cooling medium can be at different heights. The apparatus permits it, to make the cooling bath in the region of the first and second transporting inlet means so deep, that the ropes are already sufficiently surface hardened when gripped by the abutting transporting bands of the second inlet roller so that sticking of the ropes to the transporting bands is avoided. Thereupon, the ropes are transported into the second container in which the intensity of the cooling can be adjusted to the properties of the synthetic material of which the respective ropes consist, by varying the level of the cooling medium in the second container so that the ropes pass in the second container partly through the cooling medium, and partly through air. The higher the level of the cooling medium is in the second container, the more are the ropes cooled. By varying the level in the second container, the apparatus can be adapted to cool different synthetic materials to the desired temperature in which the ropes are sufficiently hard, but are still warm enough to evaporate cooling medium adhering to the same when leaving the second container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic, fragmentary vertical sectional view illustrating an apparatus according to one embodiment of the invention in a starting position;

FIG. 1a is a fragmentary bottom view of an extrusion head used in the embodiment of FIG. 1;

DESCRIPTION OF THE PREFERRED EMBODIMENTS

Figure 1B:
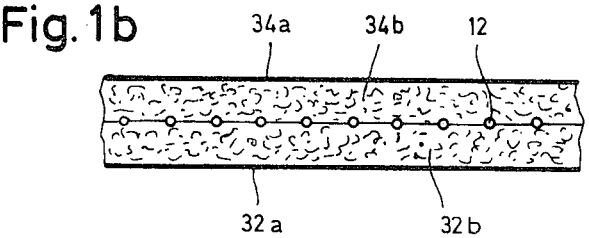
FIG. 1b is a fragmentary cross-sectional view taken on line 1b—1b in FIG. 1 and illustrating a pair of transporting bands according to the invention.

From an extrusion nozzle means 10, which has a row of openings 10a, see FIG. 1a, a row of extruded ropes 12 consisting of a synthetic material is extruded in a vertical plane along a path. The cooling apparatus has a tub-like container 14 for a cooling medium, preferably water, which fills the container 14 to the water level 16. Two sets of rollers 20 to 31 are rotatably mounted on the side walls 18 of container 14. A first endless transporting band is guided about rollers 21 to 24, and 26 to 28, and a second endless transporting band 34 is guided about rollers 20, 22 to 25, and 29 to 31. As best seen in FIG. 1b, the transporting band 32, 34 has an outer fabric layer 32a, 34a, respectively, which preferably is made of rubber warp threads which are enveloped by synthetic threads and connected by synthetic weft threads to form an endless woven fabric band. The outer bands 32a, 34a have linings or inner layers 32b, 34b, respectively, which consist of an elastic, porous foam material which is capable of absorbing a great amount of cooling medium. The inner layers 32b, 34b are elastic in the direction of the thickness thereof, whereas the outer fabric bands 32a, 34a are elastic only in longitudinal direction. The two transporting bands 32, 34 abut each other, for example when passing in superimposed positions about roller 22, and since the elastic porous material of the inner linings is softer than the ropes 12, the ropes are embedded in the elastic layers. When the transporting bands 32, 34 pass in superimposed position about roller 22, band 34 is on the outside, and band 32 is on the inside of band 34 abutting the periphery of roller 22. When the transporting bands 32, 34 pass about roller 23, band 32 is the outer band, and band 34 is the inner band. Consequently, band 34 moves about roller 22, and also roller 24 at a greater speed than transporting band 32, which in the region of roller 23 moves faster than the superimposed transporting band portion 34. Due to the fact that transporting bands 32, 34 are elastic in longitudinal direction, they can expand to compensate the different speeds of each band when passing successively over rollers 22, 23, 24. The inner foam layers permit such longitudinal deformations, but are also soft enough to prevent deformation of not yet fully hardened ropes of synthetic material transported between the foam linings 32b, 34b.

When the transporting bands emerge from the cooling water, they are squeezed out by squeezing rollers 54, and 56 respectively, so that water is removed from the foam linings, and the same are capable of absorbing any moisture still adhering to the ropes 12 when the same are fed by band portions passing over output rollers 25, 26 to the gap between the pair of endless discharge belts 70 and 72, which feed the ropes to a cutting apparatus 100.

Transporting band 34 is driven by a motor 36 whose speed is gradually adjustable. A pulley and belt drive 38 and a reduction gearing 40 connect motor 36 with a shaft 42 carrying two pulleys 44 for driving two endless belts 46 and 48. Belt 46 drives through an overrunning clutch 50 the output roller 25, while endless belt 48 drives discharge roller 74 through a slip clutch 82. Belt 70 also passes about a smaller roller 76, and belt 72 passes over two rollers 78 and 80.

Where the two transporting bands 32 and 34 emerge from the cooling water, the ropes of synthetic material are already substantially rigid. Therefore, it is not possible to guide the ropes about rollers of small diameter, so that the transporting bands are guided about a curved row of small rollers 52. The squeezing rollers 54 and 56 are provided in this region. The row of guide rollers 52 has the advantage to reduce the height of the apparatus, and deflection of the transporting bands from a substantially vertical direction to a substantially horizontal direction without requiring an additional guide roller of very large diameter.

Rollers 20 and 21 and the portions of transporting bands 32, 34 transported by the same form a pair of first inlet means to which the ropes 12 are fed, since the vertical path of ropes 12 ends in the gap between the two first inlet rollers 20, 21. During rotation of inlet rollers 20 and 21 in opposite directions, the inner band portions passing about the same, respectively move in abutting position in the direction of the arrow, so that the ropes are transported toward the roller 22 which serves as a second inlet roller about which the respective band portions pass in abutting superimposed position. The superimposed band portions in the region of the second inlet roller 22 form a pair of second inlet means.

The inlet roller 21 has a shaft which is mounted on the container for movement toward and away from roller 20, and which is mounted in a bearing to which the piston rod 62 of a hydraulic motor 58 is connected. The cylinder of hydraulic motor 58 is pivotally mounted on a bracket 60 secured to the container 14. The shaft of roller 21 may be guided in slots in the side walls 18 of container 14. The cylinder of the hydraulic operating means 58 has conduit ports at both ends, so that the piston is double-acting, permitting a control of the movements of the piston in a manner which will be explained with reference to FIG. 4.

Below the extrusion head 10, a photoelectric sensing means 64 is provided, and is positioned so that ropes extruded from the nozzles 10a and moving vertically downward along the track shown in FIG. 1 in dash and dot lines, interrupt the beam of a source of light which enters a photocell when no ropes 12 are located between the sources of light and the photocell.

When the apparatus is started, the extruded ropes 12 of synthetic material are vertically moved downward due to the action of the force of gravity, and interrupt the photoelectric sensing means 64 so that a signal is generated which causes, as will be explained hereinafter with reference to FIG. 4, a movement of the hydraulic operating motor 58 by which the first inlet roller 21 is moved from the position shown in FIG. 2 in which it is spaced from the other first inlet roller 20, to the position shown in FIG. 1 in which the inlet rollers 20 and 21 are closely spaced and the bands 34, 32 driven by the same abut each other and grip the leading ends of ropes 12. The respective band portions and rollers 20 and 21 are located above the level 16 of the cooling water in container 14, so that the ropes cannot float on the surface of the cooling water since they are already engaged and transported before arriving at the lower level 16 of the cooling water. Due to the fact that the transporting bands are wet, the inner foam layers are filled with moisture and prevent sticking of the hot synthetic material to the inner surfaces of the transporting bands. The electric control circuit shown in FIG. 4 contains timing means which effect operation of hydraulic operating motor 58 only when the ropes 12 between the abutting transporting bands have reached the region of the second inlet roller 22 where the two band portions are pressed into an abutting relationship and form a pair of second inlet means. When the ropes are reliably gripped by the band portions passing over roller 22, hydraulic motor 58 is operated to shift the first inlet roller 21, to the position shown in FIG. 2 in which the band portions about the same are spaced, while the band portions in the region of the second inlet roller 22 are still in abutting position. Consequently, ropes 12 extend directly from the extrusion nozzle means 10 to the second inlet means through almost the entire height of the cooling water since inlet roller 22 is located near the bottom of container 14. Due to the different slant of the ropes 12 shown in FIG. 2, the same are no longer located in the vertical path shown in FIG. 1, and consequently do not interrupt the beam of the photoelectric sensing means 64 so that the apparatus remains in the normal operative position shown in FIG. 2.

Due to the fact that ropes 12 freely extend between the extrusion nozzles 10 and the second inlet means, the apparatus can be operated even at the start at very high speed of the rollers and transporting bands which permits the use of large nozzle openings 10a in nozzle head 10 since the diameter of the extruded ropes of synthetic material can be reduced until the material becomes rigid by cooling. When the operating speeds and forces are selected to be very high the desired stretching and thinning of the ropes 12 which were extruded to thick condition is obtained. The number of guide rollers about which the ropes 12 are guided in the cooling water, depends on the speed at which the ropes are withdrawn from the extrusion nozzles, on the properties of the respective synthetic material, and on the temperature of the cooling water, and the rollers 22, 23, 24, 52 have to be placed in the container so that the distance which the ropes move with the transporting bands, is sufficient to obtain the desired cooling effect.

As noted above, the cooled ropes emerge from the cooling water in the region of the rollers 52, and are squeezed out by squeezing rollers 54 and 56 which also move the respective band away from ropes guided by the other band, so that ropes sticking to the inner layers of the bands are separated from the same.

The endless discharge bands 70, 72 which are at the same time feeding bands for the cutting apparatus 100, consist of an elastic material. The ropes ejected by output rollers 25, 26 enter the wider gap between rollers 74 and 78 and are then frictionally gripped by the endless bands 70 and 72 between rollers 80 and 76 which are pressed together by resilient means, not shown.

Figure 3:
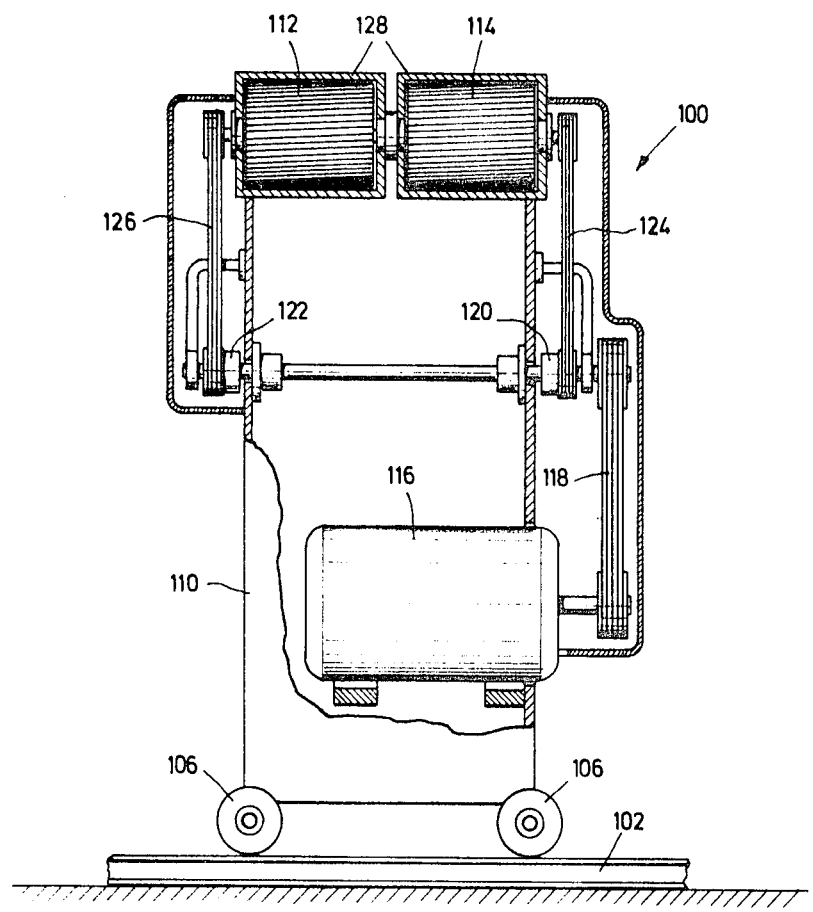
FIG. 3 is a schematic front view, partially in section, of a cutting apparatus used in combination with the cooling apparatus of the invention.

The cutting apparatus 100, also shown in FIG. 3, is not an object of the present invention and is disclosed in my copending application Ser. No. 23,329, entitled "Apparatus for Granulating Synthetic Material." The cutting apparatus has a carrier 110 with rollers 106 which are guided on supporting rails 102 for movement transverse to the direction in which the ropes are supplied by the bands 70 and 72. Two cutting heads 112 and 114 are rotatably mounted on the carrier 110, and have a common drive motor 116 which drives through pulley and belt means 118 two clutches 120 and 122 which are connected by pulley and belt drives 124 and 126 to the rotary cutting heads 112, and 114, respectively. In accordance with the engagement and disengagement of the clutches, one of the two cutting heads only is operated. A hood 128 has an inlet opening with an adjustable abutment 130 on which the hardened ropes rest while supplied by the bands 72, 70 to one or the other cutting head 112, 114 in accordance with the position of carrier 110 on the rails 102.

When one of the two cutting heads should be cleaned or serviced, it is only necessary to engage the respective clutch 120 or 122 so that the other cutting head is driven, whereupon the carrier 110 is shifted on the rails 102, 104 transversely until the ropes are fed to the cutting head which was previously inoperative and in a servicing position. The clutch of the cutting head which was rendered inoperative is disengaged so that the respective serviced cutting head stops. Consequently, the cutting and granulating apparatus 100 operates continuously and is capable to receive continuously extruded and cooled ropes.

This is even the case when one or several ropes 12 break after leaving the extrusion head 10. As is apparent from FIG. 2, ropes 12 are drawn from the extrusion head 10 in the normal operative position along a path which is spaced from the photoelectric sensing means 64, so that the light beam of the same is not interrupted. If one of the ropes breaks, it is moved by gravity along the vertical path shown in FIG. 1 into the region of the photoelectric sensing means so that the beam of the same is interrupted. The control circuit, which will be described with reference to FIG. 4, effects operation of hydraulic motor 58 so that the first inlet roller 21 is immediately moved to the starting position for gripping the broken rope end moving along the vertical path shown in FIG. 1. The cooperating transporting band portions between inlet rollers 20 and 21 abut each other and grip all extruded ropes 12 including the broken off ropes, before the same arrive at the water surface, and pull all ropes at the same high speed as before through the cooling medium. The first inlet roller 21 remains in the starting position shown in FIG. 1 until the free end of the broken-off rope has at least partly passed about the second inlet roller 22 which assures a frictional gripping of all ropes, including the broken rope when the first inlet roller 21 is retracted to the position shown in FIG. 2. As a result of this arrangement, the cooling apparatus continuously operates, even if occasionally a rope is broken since the same is automatically threaded into the space between the two transporting bands 32 and 34, and the transport of the ropes 12 is automatically continued.

Figure 4:
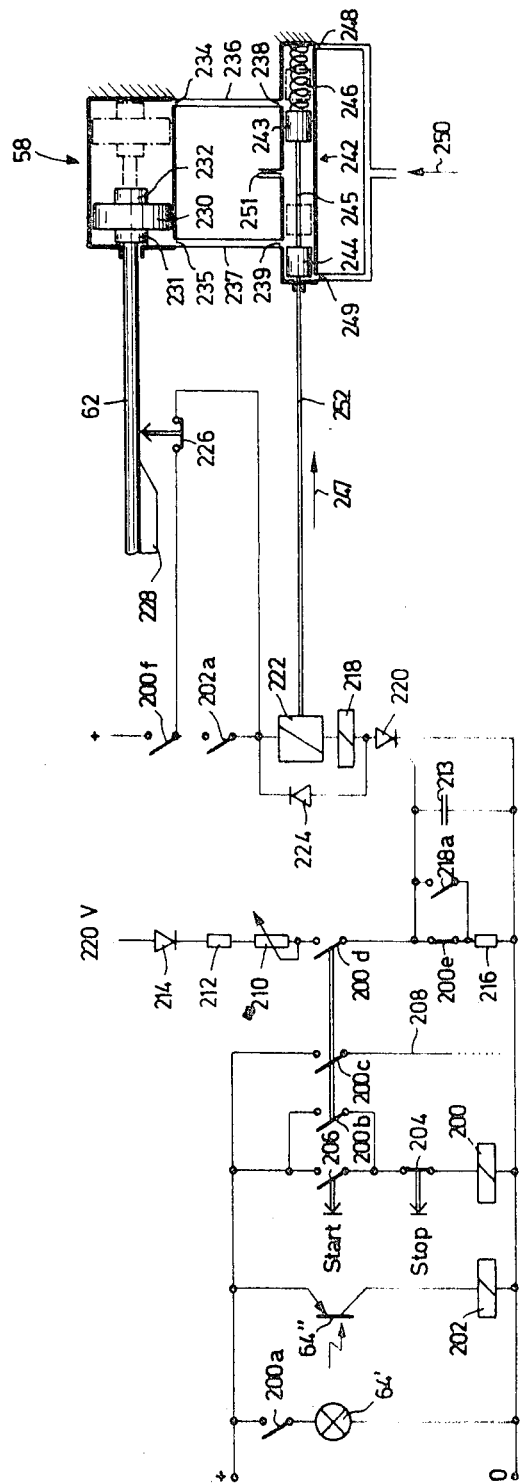
FIG. 4 is a schematic and partly diagrammatic view, illustrating an electric control circuit according to the invention, and hydraulic operating means controlled by the same.

The circuit diagram shown in FIG. 4 illustrates a control circuit, a control slide 242 for the hydraulic operating motor 58, and electromagnetic actuating means 222 for control slide 250. The photoelectric sensing means 64 shown in FIG. 1, is shown in FIG. 4 to include a source of light 64' connected to a zero volt line, and through a relay contact 200a to a plus volt line, relay contact 200a being controlled by main relay winding 200 which controls relay contacts 200a to 200f. The source of light 64' emits a beam toward a phototransistor 64", which may be interrupted by the ropes 14, as explained with reference to FIG. 1. The main relay winding 200 is connected in series with manually operated stop switch 204 between which and the positive voltage line, a start switch 206, and the holding contact 200b of main relay 200 are connected in parallel. Another contact 200c of main relay 200 is connected to electromagnetic switches in the circuit of the motors of the apparatus, not shown in FIG. 4. Another contact 200d of main relay 200 is connected in series with charging resistor means 210, 212 including a potentiometer 210 and a resistor 212. A rectifier 214 is connected in series with resistor 212 and a 220 volt source. Parallel with a capacitor 213 one terminal of which is connected to the zero voltage line, are connected a discharge resistor 216 in series with relay contacts 200e and 218a, relay contact 218a being operated by a relay winding 218. The discharge resistor 216 could be connected to a minus voltage, instead of to the zero volt line, if the resistor 212 is connected to a positive direct current voltage and the rectifier 214 is omitted.

The second terminal of capacitor 213 is connected with the gate of a thyristor 220, whose cathode is connected with the zero voltage line. It is possible to interconnect a trigger diode in order to obtain better igniting conditions. Between the anode of thyristor 220 and the positive voltage, the winding 218 of a control relay, the winding of an electromagnetic actuating means 222, a normally open relay contact 202a, and a normally open relay contact 200f are located. Relay contact 202e is operated by the sensing relay 202 which is connected in series with the phototransistor 64". Connected in parallel with control relay 218 and electromagnetic actuating means 222, is a shunting diode 224. A limit switch 226 is connected in parallel with the normally open relay contact 202a which is controlled by the photoelectric sensing means 64, 64', 64" and sensing relay 202. The normally closed contact 226 opens when engaged by a cam 218 secured to the piston rod 62 of the piston 230 of the hydraulic motor 58. Piston 230 has at both ends, projecting central portions 231, 232 which limit the strokes of the piston in the cylinder and also permit a gradual start of the stroke of the piston when the lateral wall of the cylinder is shaped in accordance with the projecting portions 231 and 232 so that the same are subjected to the pressure medium only after a certain movement of piston 230.

Openings 234 and 235 in the cylinder of hydraulic motor 58 are connected by conduits 236, 237 with ports 238, 239 in the cylinder of a control valve 242 in which two pistons 243, 244 connected by a rod 245 are located. A spring 246 urges the pistons 243, 244 opposite to the direction of the arrow 247 against one end wall of the cylinder of control valve 242. Inlet openings 248 and 249 permit, depending on the position of pistons 244, 243, supply of a pressure medium 250 to the ends of the cylinder which has an outlet opening 251 in the central region.

A rod 247 connects piston 244 with the electromagnetic actuating means 222. As long as the same is not energized, piston means 243, 244 is located in the left end position shown in FIG. 4. When electromagnetic actuating means 222 is energized, rod 245 displaces pistons 243, 244 and rod 245 in the direction of the arrow 246 against the action of spring 246 until the piston means 244, 245, 243 are in the position shown in broken lines. The pressure medium can flow through pressure conduit 236 and outlet opening 251.

Figure 2:
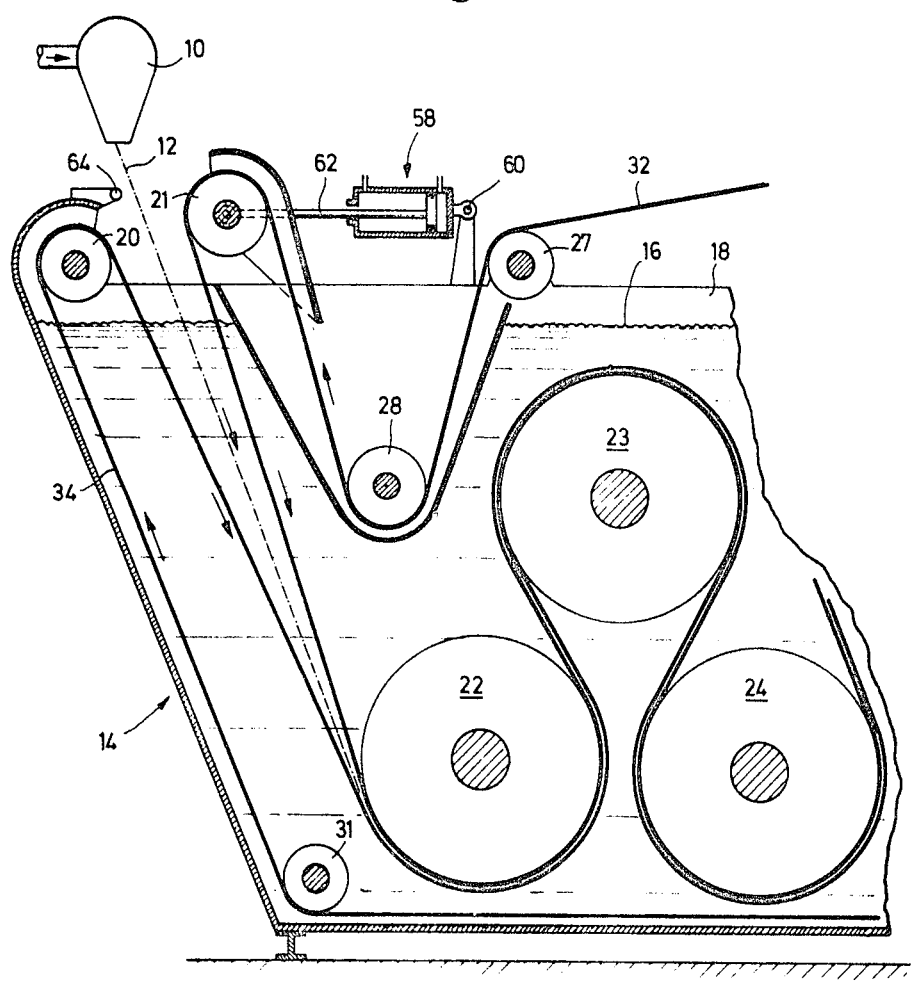
FIG. 2 is a schematic fragmentary vertical sectional view corresponding to FIG. 1, and illustrating the apparatus in a normal operating position.

In the position of piston 230 shown in broken lines in FIG. 4, the first inlet roller is in the retracted position shown in FIG. 2, in which the apparatus is normally operated. When piston 230 is moved to the position shown in full lines, inlet roller 221 is shifted to the position shown in FIG. 1 in which a pair of inlet means 20, 21, 34, 32 grips the ropes 12 moving downward along the vertical path. In this position the apparatus is started, as explained above. When electromagnetic actuating means 222 is deenergized, and piston means 244, 243 are in the left end position, hydraulic motor 58 is operated to withdraw inlet roller 21 to the position shown in FIG. 2, so that the ropes directly extend from the extrusion means 10 to abutting portions of transporting bands 32, 34 in the region of inlet roller 22. It is assumed that the voltages indicated in FIG. 2 are applied, that the pressure medium 250 is under pressure and that the start key 206 has not yet been operated. All relay contacts are in the illustrated position and main relay 200, sensing relay 202, control relay 218, and electromagnetic actuating means 222 are not energized. Piston 230 is in its left end position.

When start key 206 is depressed, the main relay 200 is energized, and holds itself over holding contact 200b until the apparatus is stopped by operation of stop key 204. Relay contact 200c and connector 208 effect operation of electromagnetic switches for starting motors 36 and 116. The start of the motors may be delayed by suitable timing devices. All rollers rotate and move the transporting bands 32, and 34. Capacitor 213, which has been discharged through the normally closed relay contact 200e, is now gradually charged through contact 200d until the gate voltage of thyristor 220 reaches the igniting point. The time between the operation of start switch 206 and the igniting of the thyristor 220 can be adjusted by operation of potentiometer 210.

When thyristor 220 ignites, current flows from the positive voltage through relay contact 200f and limit switch 226, electromagnetic actuating means 222 and control relay 218. Contact 218a of relay 218 closes, and capacitor 213 discharges through resistor 216. Due to the energizing of the electromagnetic actuating means 222, the piston means of the control valve means 242 are displaced in the direction of the arrow 247 and the pressure medium flows through conduit 237 and port 235 into hydraulic motor 58 and displaces piston 230 to its right position so that cam 228 of piston rod 62 opens limit switch 226 so that the by-pass connection of relay contact 202a of the sensing relay 202 controlled by photoelectric sensing means 64 is interrupted. Photoelectric sensing means 64 is now operative to sense the position of the ropes since the starting operation of the apparatus is terminated and the ropes are transported by the abutting transporting bands 32, 34 in the region of the inlet roller 22.

The apparatus operates now in the position of FIG. 2 in which the ropes are not located between the source of light 64' and the photodiode 64" since they extend directly from the extrusion head to the region of inlet roller 22 where the transporting bands abut each other.

If the beam of the photoelectric sensing means 64 would be interrupted, this would indicate the breaking of a rope 12. The sensing relay 202 is deenergized, and relay contact 202a opens so that the current flow through electromagnetic actuating means 222 is interrupted, and the thyristor 220 is extinguished. The control relay 218 is also deenergized and opens contact 218a so that the capacitor 213 is slowly charged through resistors 212, 210 until the voltage necessary for the thyristor 222 is obtained by the capacitor 213 and applied to the gate of the thyristor. In this manner, apparatus is automatically re-threaded and started upon any breakage of a rope.

When the stop switch 204 is operated, main relay 200 is deenergized, and all contacts 200a to 200d, and contact 200f open while the normally closed contact 200e closes, so that sensing relay 202, electromagnetic actuating means 222, and control relay 218 are deenergized. Hydraulic pressure moves piston 230 to his left effective position, and contact 200e permits the discharge of capacitor 213 over the resistor 216 so that the apparatus is stopped in a position in which it can be started by operation of the start key 206.

Figure 5:
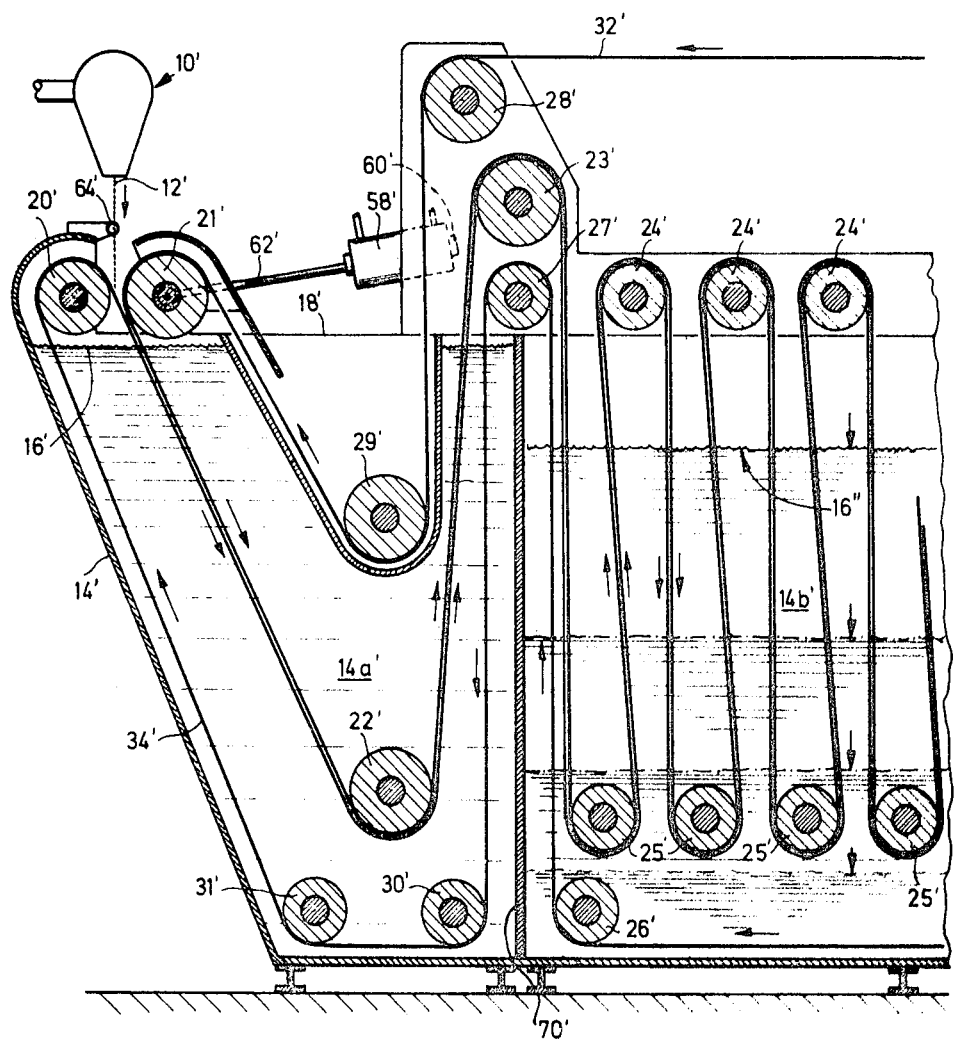
FIG. 5 is a schematic fragmentary vertical section illustrating another embodiment of the invention.

FIG. 5 illustrates a modified embodiment by which the cooling of the ropes to a predetermined desired temperature can be obtained, so that the ropes are discharged after being cooled to have a certain rigidity required for cutting, but are still warm enough to evaporate water adhering to the same after leaving the cooling medium. Parts in FIG. 5 corresponding to the embodiment of FIG. 1 are indicated by like, but primed reference numerals. A tub-shaped container 14' is divided by transverse partition wall 70' into a first container 14a' and a second container 14b'. The first container 14a' is almost completely filled with cold water to the level 16', while the level of the water in container 14b' is varied in accordance with the properties of the synthetic material of which the ropes consist, and in FIG. 5, different levels 16" are schematically indicated. The second container 14b' may be filled with warm water, if required, so that the ropes are sufficiently warm when emerging from the water in the second container 14b'. In the lateral walls 18' of the container means 14' two sets of rollers 20' to 31' are mounted for rotation and guide two endless transporting bands 32' and 34'. Inlet rollers 20' and 21' are again located above the level 16' of cold water, and inlet roller 21 with the respective portion of transporting band 32' can be moved by operating means 58' to a position corresponding to the position shown in FIG. 2 for roller 21. Due to the high level 18', and the position of inlet roller 22' near the bottom of container 14', the ropes are cooled in the cooling water 14a' in the peripheral portions thereof so that the ropes cannot stick to the transporting bands when passing over inlet roller 22' between abutting transporting band portions. On the other hand, the ropes are also firm enough that they cannot be deformed when transported by band portions bent over guide rollers.

The height of the level 16" in the water 14b' depends on the speed at which the ropes are transported, and on the type and properties of the synthetic material of which the ropes consist. If the synthetic material can be comparatively quickly cooled, the second container 14b' is filled with little water only to a low level, or may remain empty and without any cooling medium except air, and in this event it is advantageous to provide squeezing rollers of the type shown at 54 and 56 in FIG. 1, in the region where the transporting bands emerge from the cold water in container 14a'. The squeezing rollers assure that the porous transporting bands 32, 34 are dry when passing through the empty second container 14b'. Synthetic material which cools off slowly or which is extruded at very high temperatures, is also cooled by water in container 14b', and by adjusting the level 16', a cooling to a desired temperature can be obtained. If the extruded ropes are very hot, it is also possible to use no water in second container 14b' and to disengage the transporting bands from the squeezing rollers, not shown in FIG. 5, so that the heat of the ropes evaporates the water contained in the inner foam linings of the transporting bands.

The right part of the apparatus and of the second container 14b' is broken off in FIG. 5, and it will be understood that transporting bands 32 and 34 are guided over output rollers corresponding to rollers 25 and 26 in opposite directions so that transporting band 32' moves over roller 28', while transporting band 34 moves over roller 26' to roller 27', as indicated by arrows.

In the second container 14b', the guide rollers 24' are arranged in a horizontal plane, and the guide rollers 25' are located in a lower horizontal plane. Successive rollers 24' and 25', respectively, in each horizontal plane are spaced small distances so that the transporting bands 32', 34' are deflected more than 180° so that a very long travelling distance of the transporting bands in container 14b' is obtained, while the container 14b' is comparatively short.

It will be understood that each of the elements described above, or two or more together, may also find a useful application in other types of cooling apparatus, differing from the types described above.

While the invention has been illustrated and described as embodied in a cooling apparatus for extruded ropes consisting of a synthetic material having control means for automatically restarting upon breaking of a rope, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Cooling apparatus comprising, in combination, container means filled with a cooling medium to a level; supply means above said container means for supplying at least one rope of a warm flexible material along a path; transporting means for transporting the supplied rope through the cooling medium in said container, and including a pair of first transporting inlet means located above said level and under said supply means, and a pair of second transporting inlet means located in said medium in said container means, said first transporting inlet means having an abutting starting position located in said path for receiving said rope between each other so that said rope is transported during a starting period by said first transporting inlet means into said medium and to said second transporting inlet means which transport said rope further in said medium, and a normal operating position in which said first transporting inlet means are spaced from each other and from said rope so that the same is transported only by said second transporting inlet means from said supply means into and through said medium; and operating means for moving said first transporting inlet means between said starting and normal positions.

2. Cooling apparatus as claimed in claim 1 wherein said supply means include an extrusion nozzle having a row of extrusion openings for supplying along said path a plurality of extruded ropes consisting of a synthetic material and wherein said transporting means include guide means following said second transporting inlet means for guiding said ropes along a tortuous path in said medium, and out of the same.

3. Cooling apparatus as claimed in claim 1 comprising sensing means disposed along said path and connected with said operating means for actuating the same to move said first transporting inlet means to said starting position when said rope moves along said path; and wherein said second transporting inlet means is disposed relative to said supply means so that said rope is spaced from said path and from said sensing means when said first transporting inlet means is in said spaced normal operating position and said second transporting inlet means transports said rope whereby upon breakage of the rope transported in said normal operating position, said operating means moves said first transporting inlet means to said starting position for engaging and transporting the rope end supplied along said path by said supply means.

4. Cooling apparatus as claimed in claim 3 wherein said sensing means is a photoelectric sensing means including a source of light and a photocell located on opposite sides of said path under said supply means and above said first transporting inlet means.

5. Cooling apparatus as claimed in claim 3 comprising timing means actuated by said sensing means and actuating said operating means so that said operating means moves said first transporting inlet means from said starting position to said normal operating position after the leading end of a rope transported by said first transporting inlet means in said starting position has been engaged by said second transporting inlet means.

6. Cooling apparatus as claimed in claim 1 wherein said rope is supplied in a warm, deformable condition; wherein said second transporting inlet means are spaced from said first transporting inlet means such a distance that said rope is cooled in said medium to a stable condition before entering said second transporting inlet means.

7. Cooling apparatus as claimed in claim 1 wherein said transporting means include two transporting bands, and two sets of rollers for guiding and moving said transporting bands, respectively, said two sets of rollers including a pair of first inlet rollers guiding a pair of first band portions of said two transporting bands and forming with the same said pair of first transporting inlet means, and at least one second inlet roller guiding a pair of superimposed abutting band portions of said two transporting bands forming said pair of second transporting inlet means; and wherein one of said first inlet rollers is connected to and movable by said operating means between a starting position in which said first band portions abut each other and transport said rope, and a normal operating position in which said first band portions are spaced from said rope so that said rope extends from said supply means directly to said superimposed abutting second band portions and is transported by the same.

8. Cooling apparatus as claimed in claim 7 wherein said transporting means include staggered guide rollers following said second inlet roller; and wherein at least one of said transporting bands is elastic in longitudinal direction thereof so that relative movement of said transporting bands is possible when said transporting bands are bent in superimposed position in opposite directions while passing from said second inlet roller to said guide rollers and over the same.

9. Cooling apparatus as claimed in claim 7 wherein at least one of said transporting bands is elastic in the direction of the thickness thereof and adapted to be deformed by said rope when abutting the other transporting band.

10. Cooling apparatus as claimed in claim 9 wherein each of said transporting bands includes an outer layer consisting of a longitudinally elastic fabric, and an inner layer consisting of a porous material elastic in the direction of the thickness thereof and adapted to be deformed by said rope when the inner layers of said two transporting bands abut each other.

11. Cooling apparatus as claimed in claim 10 wherein said two sets of transporting rollers include guide rollers following said second inlet roller for guiding said two transporting bands in an abutting superimposed position with said rope inbetween along a tortuous path through said medium and out of the same; and wherein the length of said tortuous path is selected in accordance with the speed of said transporting means, the temperature and the heat conducting properties of said medium, and the material of said rope so that said rope is still sufficiently warm when moving out of said medium to evaporate medium adhering thereto, but is cooled sufficiently for further treatment.

12. Apparatus as claimed in claim 11 wherein said container means includes a first container in which said pair of said second transporting inlet means is located in said medium, and above which said pair of said first transporting inlet means is located, and a second container in which said guide rollers are located; wherein the level of the medium in said first container is located between said first and second transporting inlet means, and the level of said medium in said second container is variable between different levels; and wherein alternate rollers of said guide rollers are located above and below said level, respectively, in said second container.

13. Cooling apparatus as claimed in claim 12 wherein said second inlet roller deflects said two superimposed transporting bands substantially 180°, and is located near the bottom of said first container; wherein alternate guide rollers are located in two horizontal planes; and wherein successive guide rollers are spaced a small distance in said two horizontal planes so that said superimposed transporting bands are deflected by each of said guide rollers substantially 180°.

14. Cooling apparatus as claimed in claim 12 wherein said container means includes a tub having a bottom wall and side walls, and a partitioning wall transverse to said side walls and bottom wall dividing said tub into said first and second containers.

15. Cooling apparatus as claimed in claim 11 comprising discharging means including two sets of discharge rollers and two endless discharge bands guided over said discharge rollers and having cooperating moving band portions for transporting the leading end of said rope leaving said container means, said discharge bands being elastic, and motor means connected with at least one roller of one of said sets of discharge rollers for driving the respective discharge band.

16. Cooling apparatus as claimed in claim 15 wherein said discharging means include a slip clutch connecting said motor means with said one discharge roller; wherein said two sets of rollers of said transporting means include a pair of output rollers; and comprising an overrunning clutch connecting one of said output rollers with said motor means.

17. Cooling apparatus as claimed in claim 7 wherein said two sets of rollers of said transporting means include a pair of output rollers located above the level of said medium and deflecting said two superimposed transporting bands in opposite direction along the peripheries thereof; and squeezing rollers located above said level for squeezing the medium out of said transporting bands before the same enter between said output rollers.

18. Cooling apparatus as claimed in claim 1 wherein said operating means include a hydraulic motor.

19. Cooling apparatus as claimed in claim 1 comprising photoelectric sensing means disposed along said path and connected with said operating means for actuating the same to move said first transporting inlet means to said starting position when said rope moves along said path; wherein said second transporting inlet means is disposed relative to said supply means so that said rope is spaced from said path and from said photoelectric sensing means when said first transporting inlet means is in said spaced normal operating position and said second transporting inlet means transports said rope whereby upon breakage of the rope transported in said normal operating position, said operating means moves said first transporting inlet means to said starting position for engaging and transporting the rope end supplied along said path by said supply means; comprising an electric timing circuit actuated by said photoelectric sensing means and actuating said operating means so that said operating means moves said first transporting inlet means from said starting position to said normal operating position after the leading end of a rope transported by said first transporting inlet means in said starting position has been engaged by said second transporting inlet means, said electric timing circuit including electromagnetic actuating means; and wherein said operating means include a hydraulic motor, and control valve means operated by said electromagnetic actuating means to cause movements of said hydraulic motor by which said first transporting inlet means is shifted between said starting and normal operating positions.

20. Cooling apparatus as claimed in claim 19 wherein said electric timing circuit includes a start switch and a stop switch, a main relay controlled by said start and stop switches, a sensing relay controlled by said photoelectric sensing means, a thyristor, a capacitor connected with the gate of said thyristor, a control relay in series with said thyristor and having a relay contact controlling the charging of said capacitor, and a potentiometer connected with said thyristor and said capacitor for adjusting the time between operation of said start switch and igniting of said thyristor; and wherein said electromagnetic actuating means is connected in series with said thyristor and energized by the same.

References Cited

UNITED STATES PATENTS

| | | | |
|---|---|---|---|
| 2,563,184 | 8/1951 | Naylor | 226—172UX |
| 3,015,427 | 1/1962 | Kessler | 226—172 |
| 3,254,820 | 6/1966 | Hawkins | 226—172 |
| 3,518,722 | 7/1970 | Ryan | 18—12TT |

J. SPENCER OVERHOLSER, Primary Examiner

B. D. TOBOR, Assistant Examiner

U.S. Cl. X.R.

18—Dig. 9, 12T.S.; 226—172, 176